(12) United States Patent
Tanaka et al.

(10) Patent No.: US 9,083,017 B2
(45) Date of Patent: Jul. 14, 2015

(54) FUEL CELL STACK

(75) Inventors: Hiroyuki Tanaka, Wako (JP); Narutoshi Sugita, Wako (JP); Kentaro Ishida, Wako (JP); Keisuke Ando, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 797 days.

(21) Appl. No.: 13/007,676

(22) Filed: Jan. 17, 2011

(65) Prior Publication Data

US 2011/0183227 A1 Jul. 28, 2011

(30) Foreign Application Priority Data

Jan. 27, 2010 (JP) ................................. 2010-015903

(51) Int. Cl.
*H01M 8/04* (2006.01)
*H01M 8/02* (2006.01)
*H01M 8/10* (2006.01)

(52) U.S. Cl.
CPC ........ *H01M 8/04201* (2013.01); *H01M 8/0206* (2013.01); *H01M 8/0247* (2013.01); *H01M 2008/1095* (2013.01); *H01M 2250/20* (2013.01); *Y02E 60/50* (2013.01); *Y02T 90/32* (2013.01)

(58) Field of Classification Search
CPC ............ H01M 8/0258; H01M 8/0265; H01M 8/2415; H01M 8/0254; H01M 8/026
USPC .......... 429/455, 457, 514, 483, 456, 458, 459
See application file for complete search history.

(56) References Cited

U.S. PATENT DOCUMENTS

| 7,393,607 B2 * | 7/2008 | Mohri et al. .................. 429/458 |
| 8,039,162 B2 * | 10/2011 | Ishioka et al. ................ 429/452 |
| 2005/0255367 A1 * | 11/2005 | Takahashi et al. .............. 429/38 |

FOREIGN PATENT DOCUMENTS

| JP | 4062797 B2 | 6/2000 |
| JP | 2002-216785 | 8/2002 |
| JP | 2003-229144 | 8/2003 |
| JP | 2003229144 | * 8/2003 |
| JP | 2005-327532 | 11/2005 |
| JP | 2008-171822 | 7/2008 |

OTHER PUBLICATIONS

Chinese Office Action for corresponding CN Application No. 201010603990.X, May 6, 2013.
Chinese Office Action for corresponding CN Application No. 201010603990.X, Dec. 24, 2013.
Chinese Office Action for corresponding CN Application No. 201010903990.X. Jun. 25, 2014.
Japanese Office Action for corresponding JP Application No. 2010-015903, Aug. 29, 2013.

* cited by examiner

*Primary Examiner* — Ula C Ruddock
*Assistant Examiner* — Thomas Parsons
(74) *Attorney, Agent, or Firm* — Mori & Ward, LLP (57) ABSTRACT

A fuel cell stack includes a plurality of unit cells stacked in a stacking direction substantially along a direction of gravity. Each of the plurality of unit cells includes a first metal separator, a second metal separator, and a membrane electrode assembly sandwiched between the first metal separator and the second metal. A reactant gas channel allows a reactant gas to flow along a surface of each of the first and second metal separators. A reactant gas inlet manifold and a reactant gas outlet manifold allow the reactant gas to flow the reactant gas inlet manifold and the reactant gas outlet manifold in the stacking direction. A bridge portion forms a connection channel to connect at least the reactant gas outlet manifold to the reactant gas channel. The bridge portion includes a guide portion to break a continuity of condensed water.

9 Claims, 14 Drawing Sheets

FUEL CELL STACK

CROSS-REFERENCE TO RELATED APPLICATIONS

The present application claims priority under 35 U.S.C. §119 to Japanese Patent Application No. 2010-015903, filed Jan. 27, 2010, entitled "Fuel Cell Stack". The contents of this application are incorporated herein by reference in their entirety.

BACKGROUND OF THE INVENTION

1. Field of the Invention

The present invention relates to a fuel cell stack.

2. Description of the Related Art

A solid polymer electrolyte fuel cell, for example, includes unit cells. Each of the unit cells includes a membrane electrode assembly (MEA) and separators sandwiching the MEA therebetween. The MEA includes an electrolyte membrane (electrolyte), which is a polymer ion-exchange membrane, and an anode electrode and a cathode electrode sandwiching the electrolyte membrane therebetween.

When using this type of fuel cell for an automobile, a certain number (for example, tens or hundreds) of unit cells are stacked so as to form a fuel cell stack that generates a required electric power. In general, such a fuel cell stack has a reactant gas channel and a reactant gas manifold. A reactant gas flows through the reactant gas channel along a surface of a separator and along a power generation surface. The reactant gas manifold is connected to the reactant gas channel and extends in the direction in which the unit cells are stacked. This is so-called an internal manifold structure.

Such an internal manifold type fuel cell stack has a problem in that water, which is generated by a power generating reaction, may accumulate, in particular, near an outlet manifold (reactant gas outlet manifold). Japanese Patent No. 4062797, for example, discloses a solid polymer electrolyte fuel cell having a structure for avoiding instable operation due to flooding.

Japanese Patent No. 4062797 describes a solid polymer electrolyte fuel cell including a gas manifold integrated separator. The gas manifold integrated separator includes a gas inlet manifold hole, a gas outlet manifold hole, a gas channel groove section, a gas inlet that connects the gas inlet manifold hole to the gas channel groove section, and a gas outlet that connects the gas outlet manifold hole to the gas channel groove section.

This fuel cell has a feature of having the manifold integrated separators, which sandwich the membrane electrode assembly, wherein the width of the gas channel groove section of at least the gas inlet and the gas outlet adjacent to the gas manifold is increased.

It is described that, with such a structure, the fluid resistance in the connection portion between the gas channel groove section and the gas manifold hole is decreased, and even if a part of water in the gas is condensed in the gas channel groove section, the condensed water can be easily discharged through the gas outlet to the gas manifold hole.

However, in the fuel cell described in Japanese Patent No. 4062797, because the width of the gas outlet adjacent to the gas outlet manifold hole is increased, condensed water is discharged in a continuous state through the gas outlet to the gas manifold hole. Therefore, a liquid junction occurs between unit cells that are stacked. In particular, if the separators are made of a metal, corrosion currents are easily generated on surfaces of the metal separators due to a potential difference.

As a result, the metal separators corrode and metal ions are emitted, which leads to a decrease in the performance of the electrolyte membrane. Moreover, when the metal separator becomes thinner due to the corrosion, a hole may form in the metal separator, which leads to a decrease in gas shielding capability.

SUMMARY OF THE INVENTION

According to one aspect of the present invention, a fuel cell stack includes a plurality of unit cells stacked in a stacking direction substantially along a direction of gravity. Each of the plurality of unit cells includes a first metal separator, a second metal separator, a membrane electrode assembly, a reactant gas channel, a reactant gas inlet manifold, a reactant gas outlet manifold, and a bridge portion. The membrane electrode assembly is sandwiched between the first metal separator and the second metal separator. The membrane electrode assembly includes a first electrode, a second electrode, and an electrolyte membrane. The first electrode extends substantially in a horizontal direction. The second electrode extends substantially in the horizontal direction. The electrolyte membrane is sandwiched between the first electrode and the second electrode. The reactant gas channel allows a reactant gas to flow along a surface of each of the first and second metal separators. The reactant gas inlet manifold and the reactant gas outlet manifold allow the reactant gas to flow to the reactant gas inlet manifold and the reactant gas outlet manifold in the stacking direction. The bridge portion forms a connection channel to connect at least the reactant gas outlet manifold to the reactant gas channel. The bridge portion includes a guide portion to break a continuity of condensed water.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

Figure 1:
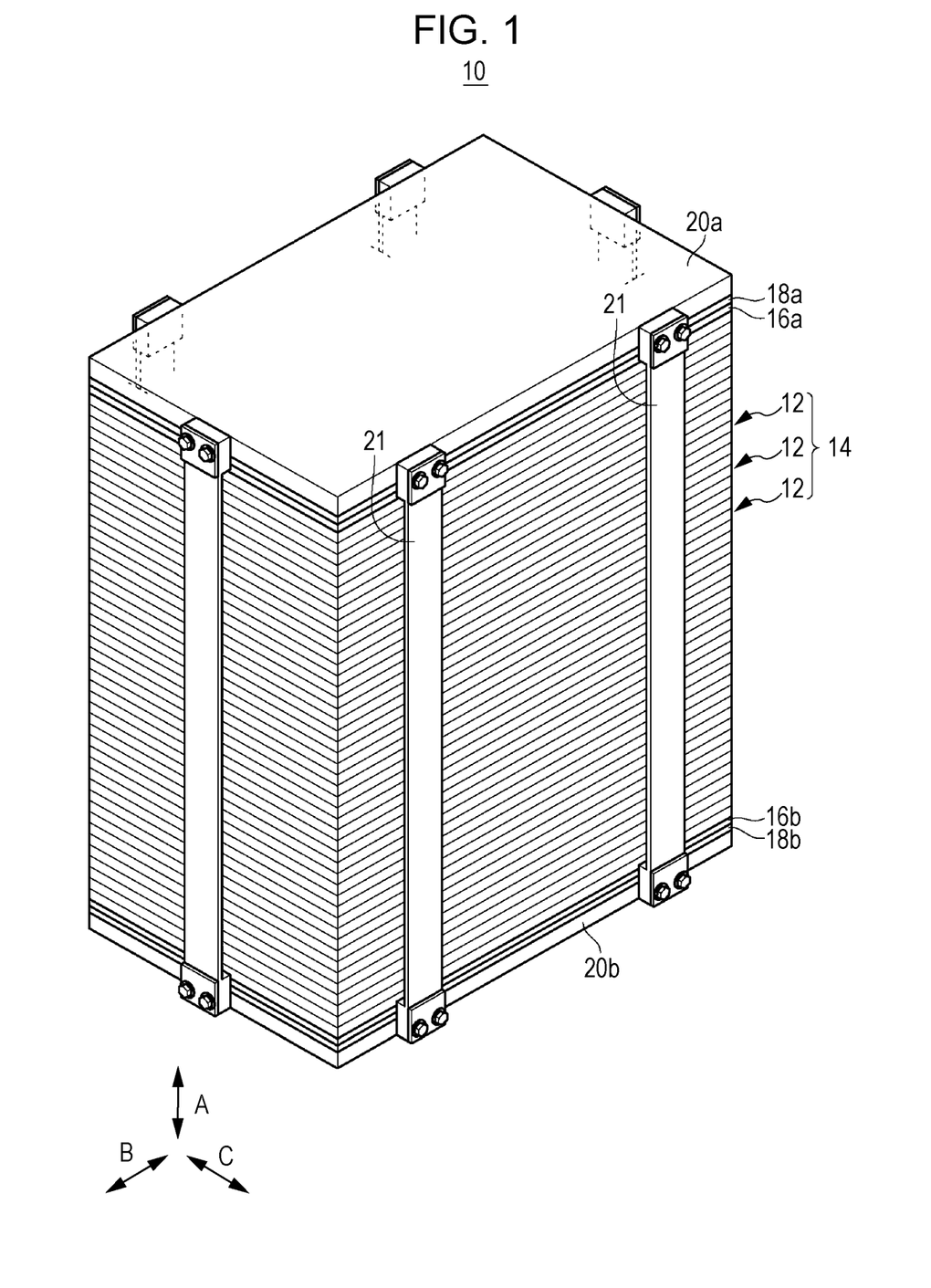
FIG. 1 is a schematic perspective view of a fuel cell stack according to a first embodiment of the present invention.

As illustrated in FIG. 1, a fuel cell stack 10 according to a first embodiment of the present invention includes a stack 14 of a plurality of unit cells 12. The unit cells 12 are stacked in the direction of gravity (direction of arrow A) so that the electrode surfaces thereof extend horizontally. At one end (the upper end) of the stack 14 in the stacking direction (direction of arrow A), a terminal plate 16a, an insulator plate 18a, and an end plate 20a are disposed in this order toward the upper end. At the other end (the lower end) of the stack 14 in the stacking direction, a terminal plate 16b, an insulator plate 18b, and an end plate 20b are disposed in this order toward the lower end.

Ends of a plurality of connection bars 21 are fixed to the end plates 20a and 20b, so that a clamping force is applied to the end plates 20a and 20b in the stacking direction. Alternatively, a clamping force may be applied to the end plates 20a and 20b in the stacking direction by using a tie rod (not shown). As a further alternative, a clamping force may be applied in the stacking direction by using a box-shaped casing.

Figure 2:
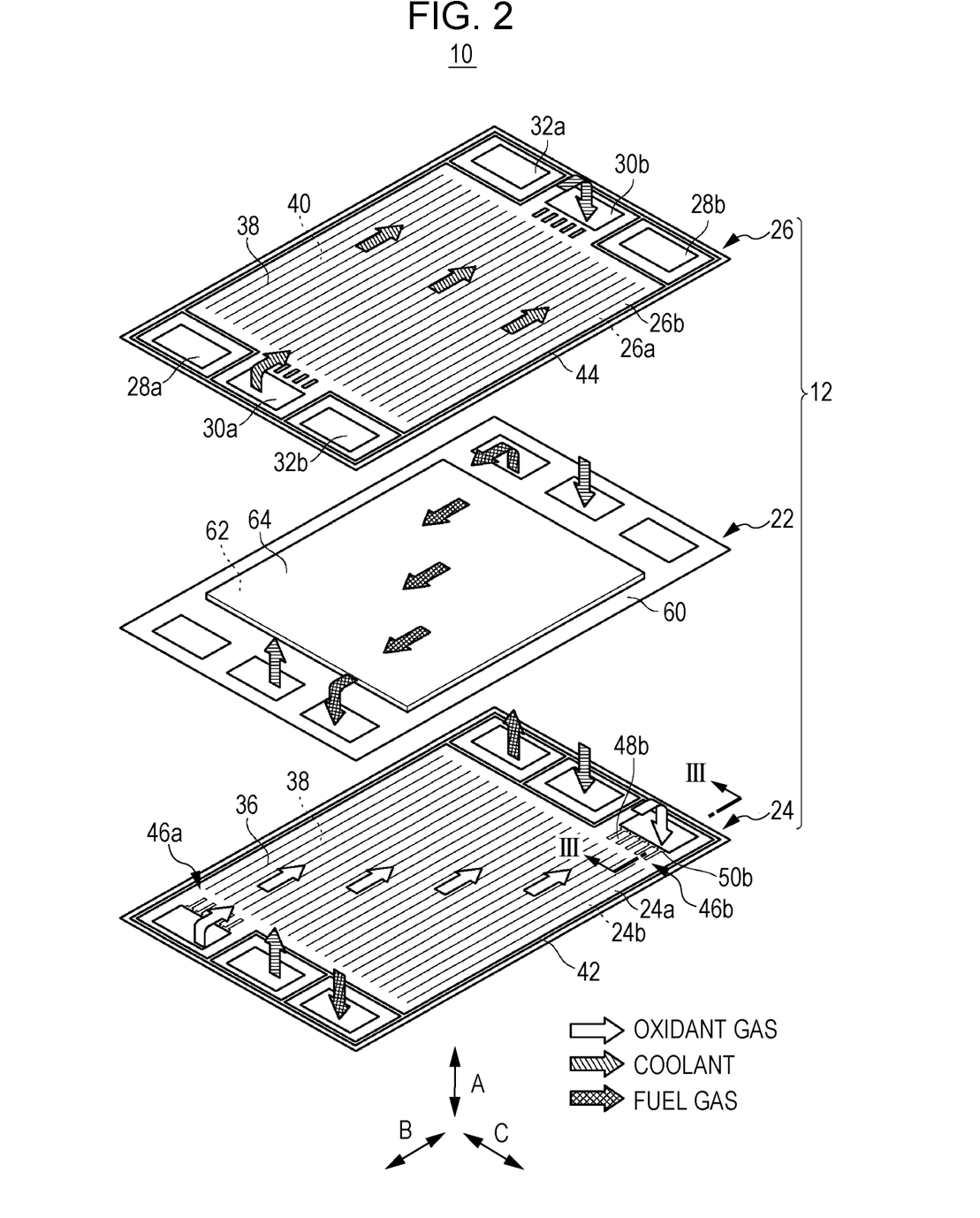
FIG. 2 is an exploded perspective view of a unit cell of the fuel cell stack.
Figure 3:
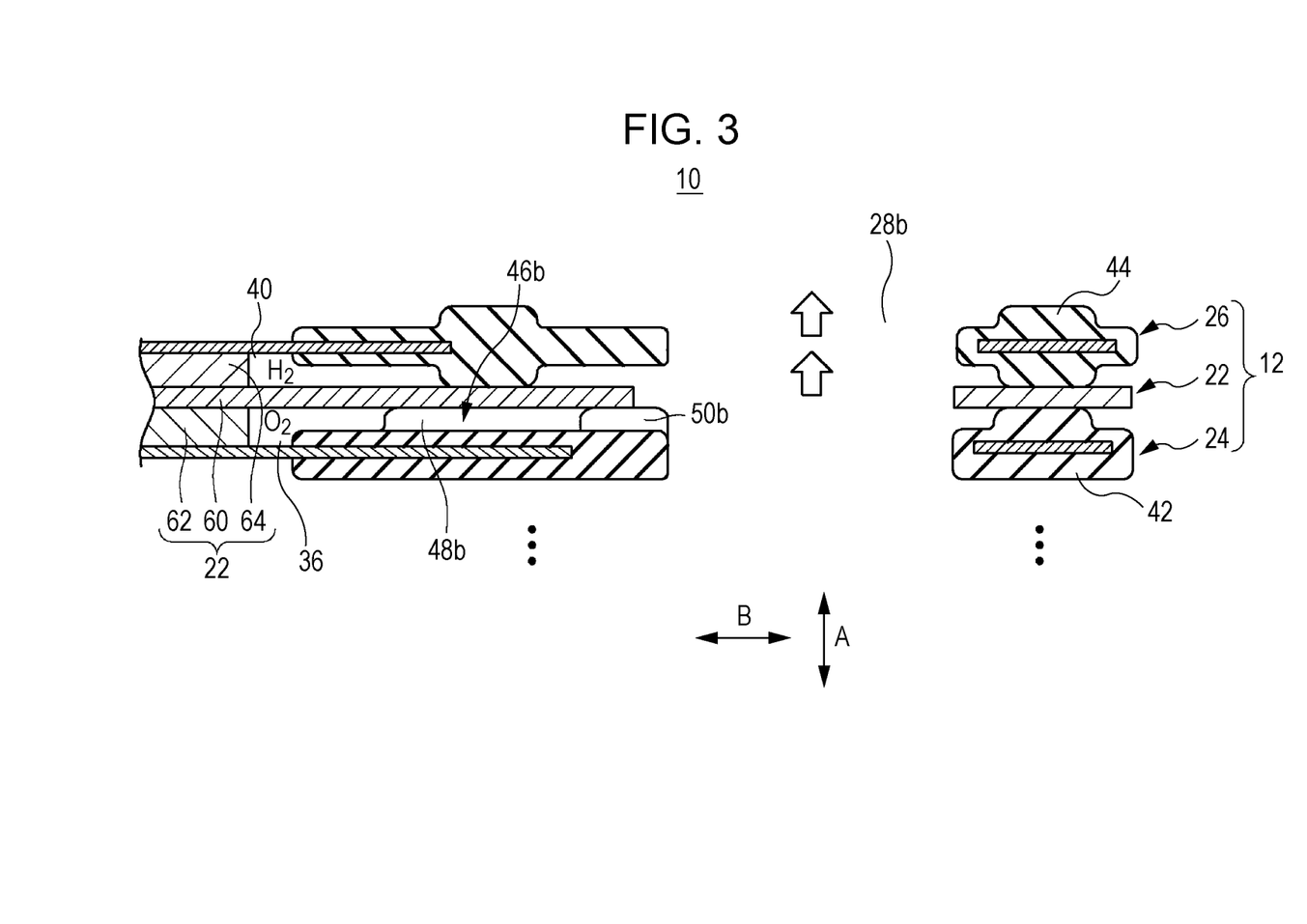
FIG. 3 is a sectional view of the fuel cell stack taken along line III-III of FIG. 2.

As illustrated in FIGS. 2 and 3, each of the unit cells 12 includes a membrane electrode assembly (MEA) 22, and first and second metal separators 24 and 26 that sandwich the membrane electrode assembly 22 therebetween.

The first and second metal separators 24 and 26 are each made of, for example, an oblong metal plate such as a steel plate, a stainless steel plate, an aluminum plate, a galvanized steel plate, or any of such metal plates coated with an anti-corrosive coating. The first and second metal separators 24 and 26 each have a rectangular shape in plan view and have protrusions and recesses in sectional view, which are formed by press-forming a thin metal plate in wave-like shapes.

As illustrated in FIG. 2, an oxidant gas inlet manifold 28a (reactant gas inlet manifold), a coolant inlet manifold 30a, and a fuel gas outlet manifold 32b (reactant gas outlet manifold) are disposed in one end portion of the unit cell 12 in the direction of arrow B (horizontal direction). The oxidant gas inlet manifold 28a, the coolant inlet manifold 30a, and the fuel gas outlet manifold 32b extend through the unit cell 12 in the direction of arrow A. An oxidant gas, such as an oxygen-containing gas, is supplied through the oxidant gas inlet manifold 28a. A coolant is supplied through the coolant inlet manifold 30a. A fuel gas, such as a hydrogen-containing gas, is discharged through the fuel gas outlet manifold 32b.

A fuel gas inlet manifold 32a (reactant gas inlet manifold), a coolant outlet manifold 30b, and an oxidant gas outlet manifold 28b (reactant gas outlet manifold) are disposed in the other end portion of the unit cell 12 in the direction of arrow B. The fuel gas inlet manifold 32a, the coolant outlet manifold 30b, and the oxidant gas outlet manifold 28b extend through the unit cell 12 in the direction of arrow A. The fuel gas is supplied through the fuel gas inlet manifold 32a. The coolant is discharged through the coolant outlet manifold 30b. The oxidant gas is discharged through the oxidant gas outlet manifold 28b.

Figure 4:
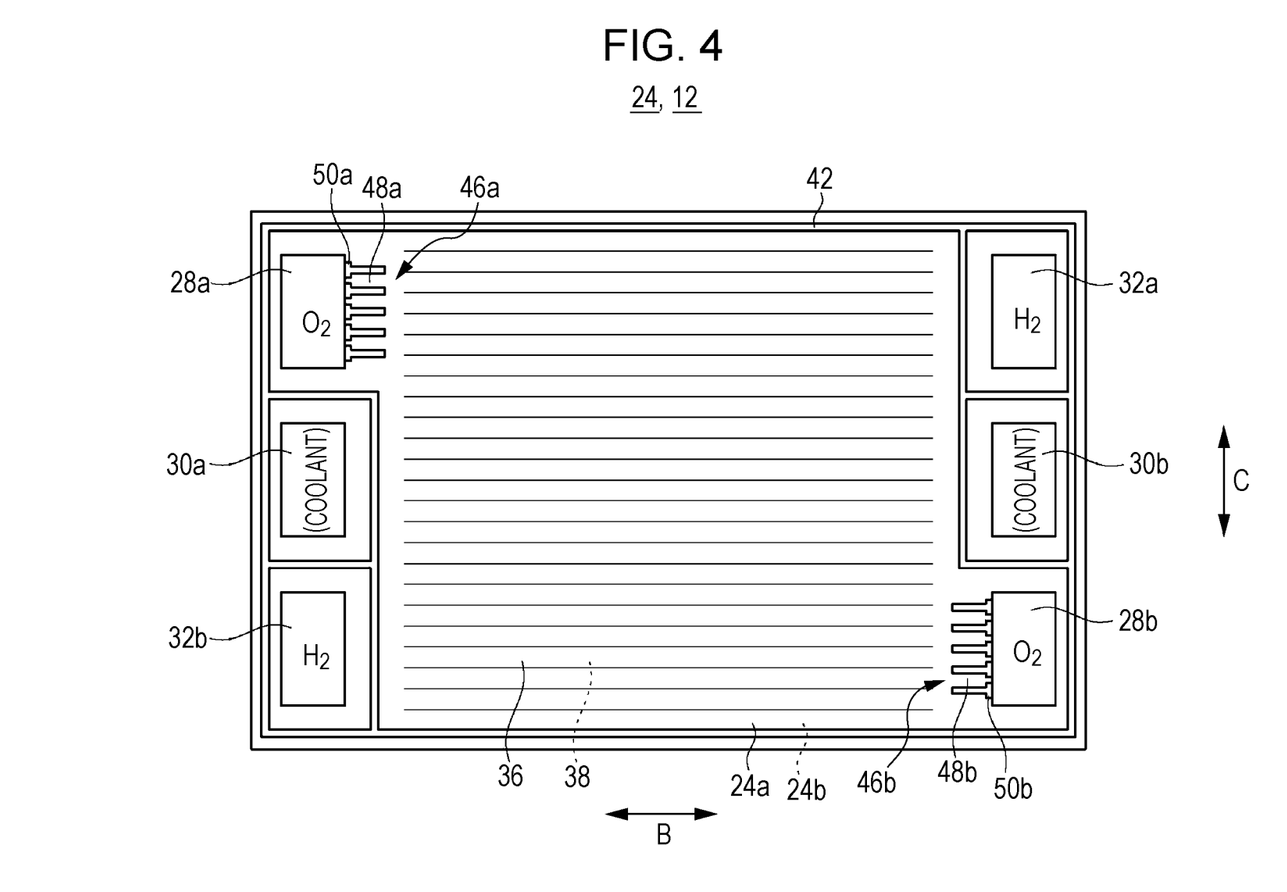
FIG. 4 is a plan view of a first metal separator of the fuel cell stack.

As illustrated in FIG. 4, an oxidant gas channel 36 is formed on a surface 24a of the first metal separator 24 that faces the membrane electrode assembly 22. The oxidant gas channel 36 extends, for example, in the direction of arrow B. The oxidant gas channel 36 is connected to the oxidant gas inlet manifold 28a and the oxidant gas outlet manifold 28b. A coolant channel 38 is formed on a surface 24b of the first metal separator 24 opposite to the surface 24a. The coolant channel 38 is connected to the coolant inlet manifold 30a and the coolant outlet manifold 30b.

Figure 5:
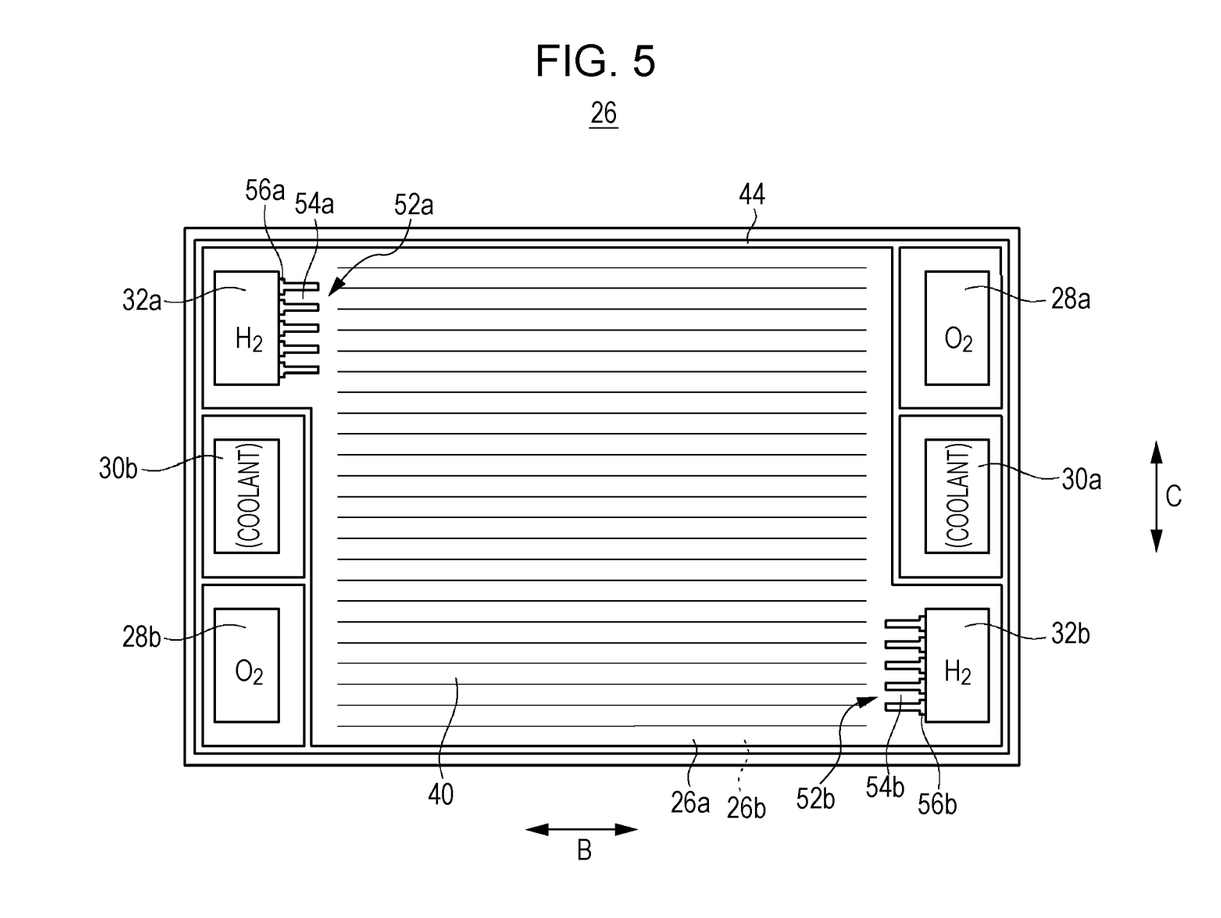
FIG. 5 is a plan view of a second metal separator of the fuel cell stack.

As illustrated in FIG. 5, a fuel gas channel 40 is formed on a surface 26a of the second metal separator 26 that faces the membrane electrode assembly 22. The fuel gas channel 40 extends in the direction of arrow B, and is connected to the fuel gas inlet manifold 32a and the fuel gas outlet manifold 32b. A coolant channel 38 is formed on a surface 26b of the second metal separator 26 opposite to the surface 26a when the unit cell 12 is stacked on another unit cell 12 and the surface 26b is superposed on the surface 24b of the first metal separator 24 of the other unit cell 12 (see FIG. 2). The coolant channel 38 is connected to the coolant inlet manifold 30a and the coolant outlet manifold 30b.

The first metal separator 24 includes a first sealing member 42 that is integrally injection molded onto the thin metal plate portion thereof. The second metal separator 26 includes a second sealing member 44 that is integrally injection molded onto the thin metal plate portion thereof.

The first and second sealing members 42 and 44 may be made of, for example, a sealing material, a cushioning material, or a packing material, such as an EPDM, an NBR, a fluorocarbon rubber, a silicone rubber, a fluorosilicone rubber, a butyl rubber, a natural rubber, a styrene rubber, a chloroprene rubber, or an acrylic rubber.

As illustrated in FIG. 4, the first sealing member 42 is formed on the surface 24a of the first metal separator 24 so as to connect the oxidant gas channel 36 to the oxidant gas inlet manifold 28a and to the oxidant gas outlet manifold 28b. The first sealing member 42 includes an inlet bridge portion 46a and an outlet bridge portion 46b, each of which is integrally formed with the first sealing member 42. The inlet bridge portion 46a is disposed adjacent to the oxidant gas inlet manifold 28a, and the outlet bridge portion 46b is disposed adjacent to the oxidant gas outlet manifold 28b.

The inlet bridge portion 46a forms a plurality of connection channels 48a that connect the oxidant gas inlet manifold 28a to the oxidant gas channel 36. The outlet bridge portion 46b forms a plurality of connection channels 48b that connect the oxidant gas outlet manifold 28b to the oxidant gas channel 36.

Protrusions 50a are formed at an end of the inlet bridge portion 46a adjacent to the oxidant gas inlet manifold 28a. The protrusions 50a protrude in the width direction (in the direction of arrow C) and are disposed in the connection channels 48a. The protrusions 50a correspond to a guide portion for breaking the continuity of condensed water. Likewise, protrusions 50b are formed at an end of the outlet bridge portion 46b adjacent to the oxidant gas outlet manifold 28b.

The protrusions 50b protrude in the width direction and are disposed in the connection channels 48b. The protrusions 50b correspond to a guide portion for breaking the continuity of condensed water.

Figure 6:
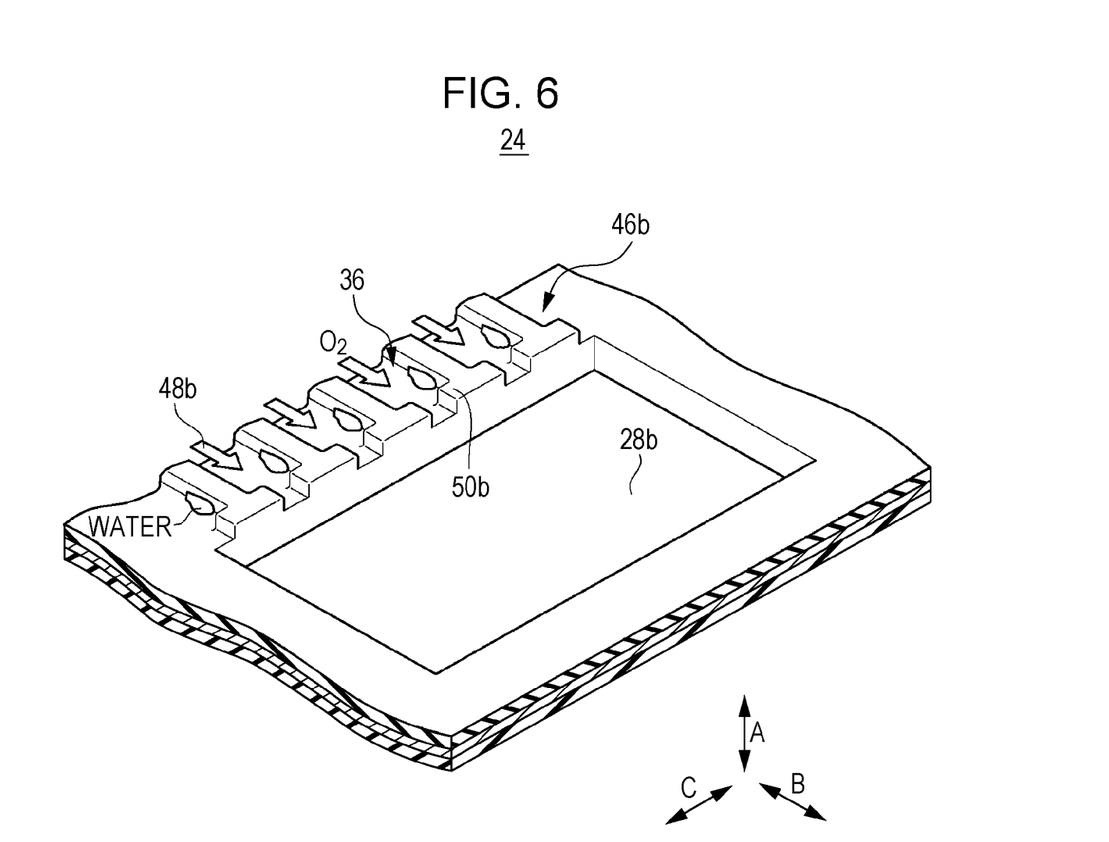
FIG. 6 is a perspective view of an outlet bridge portion of the first metal separator.

The protrusions 50a and 50b are integrally formed with the inlet bridge portion 46a and the outlet bridge portion 46b, respectively. The inlet bridge portion 46a and the outlet bridge portion 46b are integrally formed with the first sealing member 42. As illustrated in FIG. 6, the protrusions 50b have a height that is the same as that of the outlet bridge portion 46b. The protrusions 50b are substantially T-shaped in plan view. The protrusions 50a are substantially the same as the protrusions 50b.

As illustrated in FIG. 5, the second sealing member 44 is formed on the surface 26a of the second metal separator 26 so as to connect the fuel gas channel 40 to the fuel gas inlet manifold 32a and to the fuel gas outlet manifold 32b. The second sealing member 44 includes an inlet bridge portion 52a and an outlet bridge portion 52b, each of which is integrally formed with the second sealing member 44. The inlet bridge portion 52a is disposed adjacent to the fuel gas inlet manifold 32a, and the outlet bridge portion 52b is disposed adjacent to the fuel gas outlet manifold 32b.

The inlet bridge portion 52a forms a plurality of connection channels 54a that connect the fuel gas inlet manifold 32a to the fuel gas channel 40. The outlet bridge portion 52b forms a plurality of connection channels 54b that connect the fuel gas outlet manifold 32b to the fuel gas channel 40. Protrusions 56a are integrally formed at an end of the inlet bridge portion 52a adjacent to the fuel gas inlet manifold 32a. The protrusions 56a protrude in the width direction. The protrusions 56a correspond to a guide portion for breaking the continuity of condensed water. Protrusions 56b are integrally formed at an end of the outlet bridge portion 52b adjacent to the fuel gas outlet manifold 32b. The protrusions 56b protrude in the width direction. The protrusions 56b correspond to a guide portion. Detailed descriptions of the protrusions 56a and 56b, which are substantially the same the protrusions 50a and 50b, will be omitted.

As illustrated in FIGS. 2 and 3, the membrane electrode assembly 22 includes a solid-polymer electrolyte membrane 60 (electrolyte), and a cathode electrode 62 and an anode electrode 64 that sandwich the solid polymer electrolyte membrane 60 therebetween. The solid-polymer electrolyte membrane 60 is, for example, a thin film made of a perfluorosulfonate polymer that is impregnated with water.

The cathode electrode 62 and the anode electrode 64 each include a gas diffusion layer and an electrode catalyst layer. The gas diffusion layer is made of carbon paper or the like. The electrode catalyst layer is made by uniformly coating a surface of the gas diffusion layer with porous carbon particles whose surfaces support a platinum alloy. The electrode catalyst layer is disposed on either side of the solid polymer electrolyte membrane 60.

The end plate 20b, which is illustrated in FIG. 1, includes a manifold member (not shown) that is connected to the oxidant gas inlet manifold 28a, the coolant inlet manifold 30a, the fuel gas outlet manifold 32b, the fuel gas inlet manifold 32a, the coolant outlet manifold 30b, and the oxidant gas outlet manifold 28b.

Hereinafter, the operation of the fuel cell stack 10 will be described.

First, an oxidant gas, such as an oxygen-containing gas, is supplied to the oxidant gas inlet manifold 28a through the manifold member of the end plate 20b, which is illustrated in FIG. 1. A fuel gas, such as a hydrogen-containing gas, is supplied to the fuel gas inlet manifold 32a through the manifold member of the end plate 20b. A coolant, such as pure water, ethylene glycol, or oil, is supplied to the coolant inlet manifold 30a.

As illustrated in FIG. 2, the oxidant gas is introduced through the oxidant gas inlet manifold 28a to the oxidant gas channel 36 disposed on the first metal separator 24. Thus, the oxidant gas flows through the oxidant gas channel 36 in the direction of arrow B, and is supplied to the cathode electrode 62 of the membrane electrode assembly 22.

The fuel gas is introduced through the fuel gas inlet manifold 32a to the fuel gas channel 40 disposed on the second metal separator 26. The fuel gas flows through the fuel gas channel 40 in the direction of arrow B, and is supplied to the anode electrode 64 of the membrane electrode assembly 22.

The oxidant gas and the fuel gas, which are respectively supplied to the cathode electrode 62 and the anode electrode 64, cause electrochemical reactions in the electrode catalyst layers of the membrane electrode assembly 22, thereby generating electric power.

Next, the oxidant gas, which has been supplied to the cathode electrode 62 of the membrane electrode assembly 22 and has been used in the electrochemical reaction, is discharged to the oxidant gas outlet manifold 28b. The fuel gas, which has been supplied to the anode electrode 64 and has been used in the electrochemical reaction, is discharged to the fuel gas outlet manifold 32b. The coolant is introduced through the coolant inlet manifold 30a to the coolant channel 38, and flows in the direction of arrow B. The coolant cools the membrane electrode assembly 22, and then is discharged to the coolant outlet manifold 30b.

Water is generated in the oxidant gas channel 36 when the oxidant gas, which is supplied through the oxidant gas inlet manifold 28a, causes the electrochemical reaction. The water is discharged to the oxidant gas outlet manifold 28b together with the used oxidant gas.

In the first embodiment, as illustrated in FIGS. 4 and 6, the outlet bridge portion 46b, which forms the connection channels 48b, is disposed between the oxidant gas channel 36 and the oxidant gas outlet manifold 28b. At an end of the outlet bridge portion 46b adjacent to the oxidant gas outlet manifold 28b, the protrusions 50b are integrally formed so as to protrude in the width directions and so as to be disposed in the connection channels 48b.

Therefore, when the water (condensed water) flows through the connection channels 48b together with the oxidant gas that has not been used in the electrochemical reaction, the flow of the water is obstructed by the protrusions 50b protruding in the connection channels 48b, whereby the continuity of the water is broken. Thus, occurrence of a liquid junction between the unit cells 12 is prevented with a simple structure.

In particular, a corrosion current due to a potential difference is not generated on the first metal separator 24 and the second metal separator 26. Therefore, a decrease in the gas shielding performance due to thinning of the metal separators can be effectively prevented. As a result, the unit cells 12 can efficiently cause a power generating reaction for a long time.

As illustrated in FIG. 5, on the second metal separator 26, the outlet bridge portion 52b is disposed between the fuel gas channel 40 and the fuel gas outlet manifold 32b. The protrusions 56b are integrally formed at an end of the outlet bridge portion 52b.

Therefore, when condensed water, which is generated in the fuel gas channel 40, is introduced to the connection channel 54b, the flow of the condensed water is obstructed by the protrusions 56b and the continuity of the condensed water is effectively broken. Thus, the outlet bridge portion 52b functions in the same manner as the outlet bridge portion 46b described above.

Figure 7:
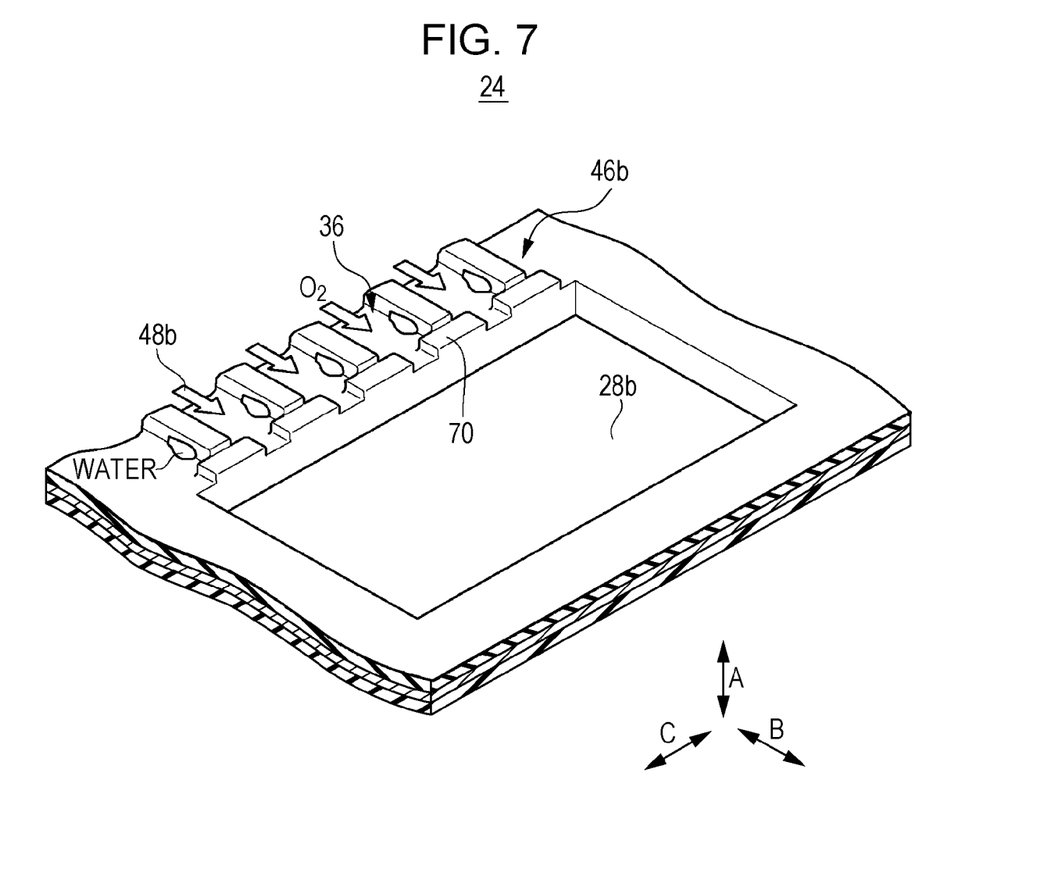
FIG. 7 is a perspective view of a modification of the outlet bridge portion.
Figure 8:
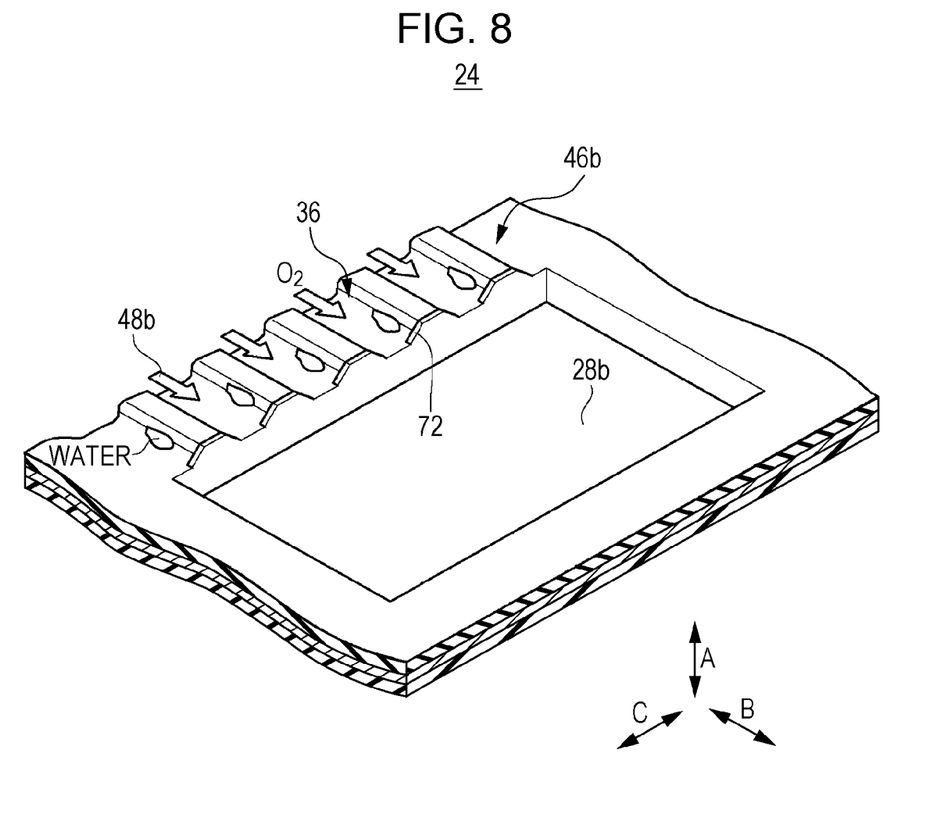
FIG. 8 is a perspective view of another modification of the outlet bridge portion.

The protrusions 50b, which are integrally formed with the outlet bridge portion 46b, have the same height as that of the outlet bridge portion 46b. However, the protrusions are not limited thereto. For example, as illustrated in FIG. 7, protrusions 70, which have a height that is substantially half the height of the outlet bridge portion 46b, may be integrally formed with the outlet bridge portion 46b. Alternatively, as illustrated in FIG. 8, protrusions 72, which are substantially trapezoidal (or triangular) in front view, may be integrally formed with the outlet bridge portion 46b at ends of the outlet bridge portion 46b. This also applies to the embodiments described below.

Figure 9:
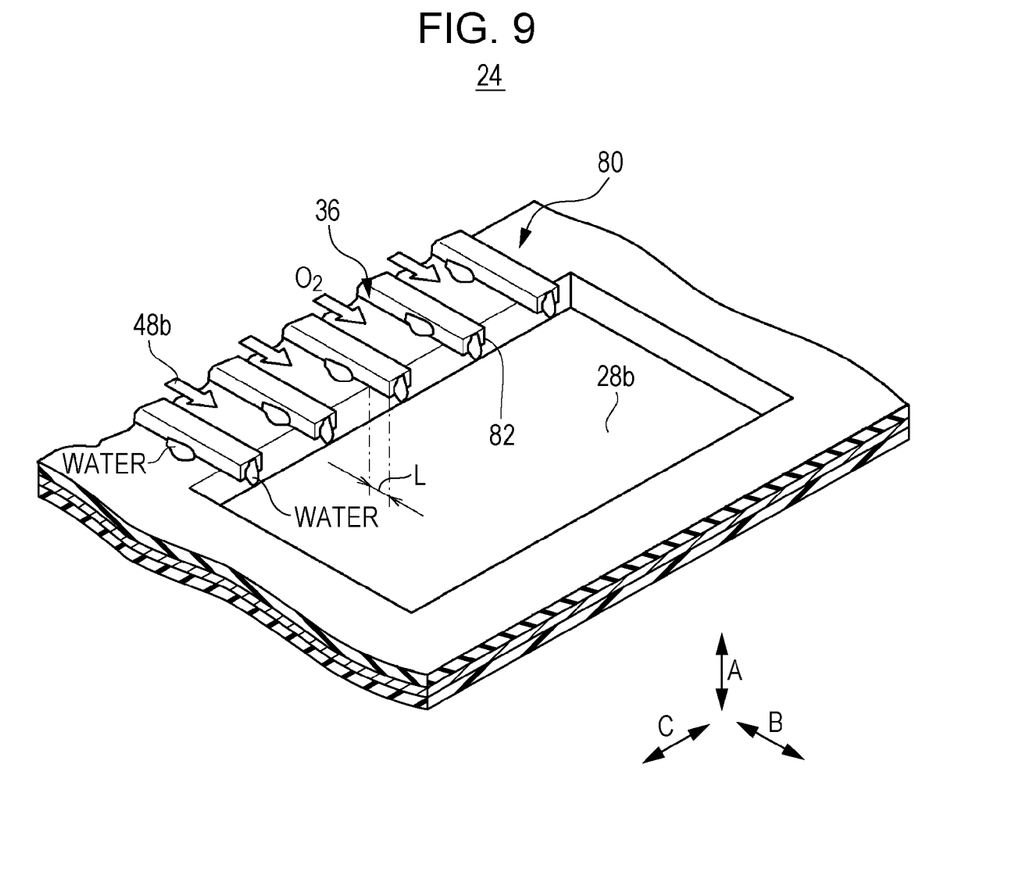
FIG. 9 is a perspective view of an outlet bridge portion of a fuel cell stack according to a second embodiment of the present invention.

FIG. 9 is a perspective view of an outlet bridge portion 80 of a fuel cell stack according to a second embodiment of the present invention.

Elements of the fuel cell stack that are the same as those of the fuel cell stack 10 according to the first embodiment will be denoted by the same numerals, and detailed description of such elements will be omitted. This also applies to third to seventh embodiments described below.

The outlet bridge portion 80, which is disposed between the oxidant gas outlet manifold 28b and the oxidant gas channel 36 of the first metal separator 24, will only be described below. The inlet bridge portion for the oxidant gas, the outlet bridge portion for the fuel gas, and the inlet bridge portion for the fuel gas have structures that are substantially the same as that of the outlet bridge portion 80, and the description of these bridge portions will be omitted.

The outlet bridge portion 80 forms the connection channels 48b. Projections 82, each projecting a distance L into the oxidant gas outlet manifold 28b, are formed at an end of the outlet bridge portion 80 adjacent to the oxidant gas outlet manifold 28b.

Therefore, in the second embodiment, the connection channels 48b have a larger length, and the projections 82 project into the oxidant gas outlet manifold 28b. Thus, water droplets drop off the ends of the projections 82 and thereby the continuity of condensed water is easily and reliably broken. As a result, an effect the same as that of the first embodiment is produced.

Figure 10:
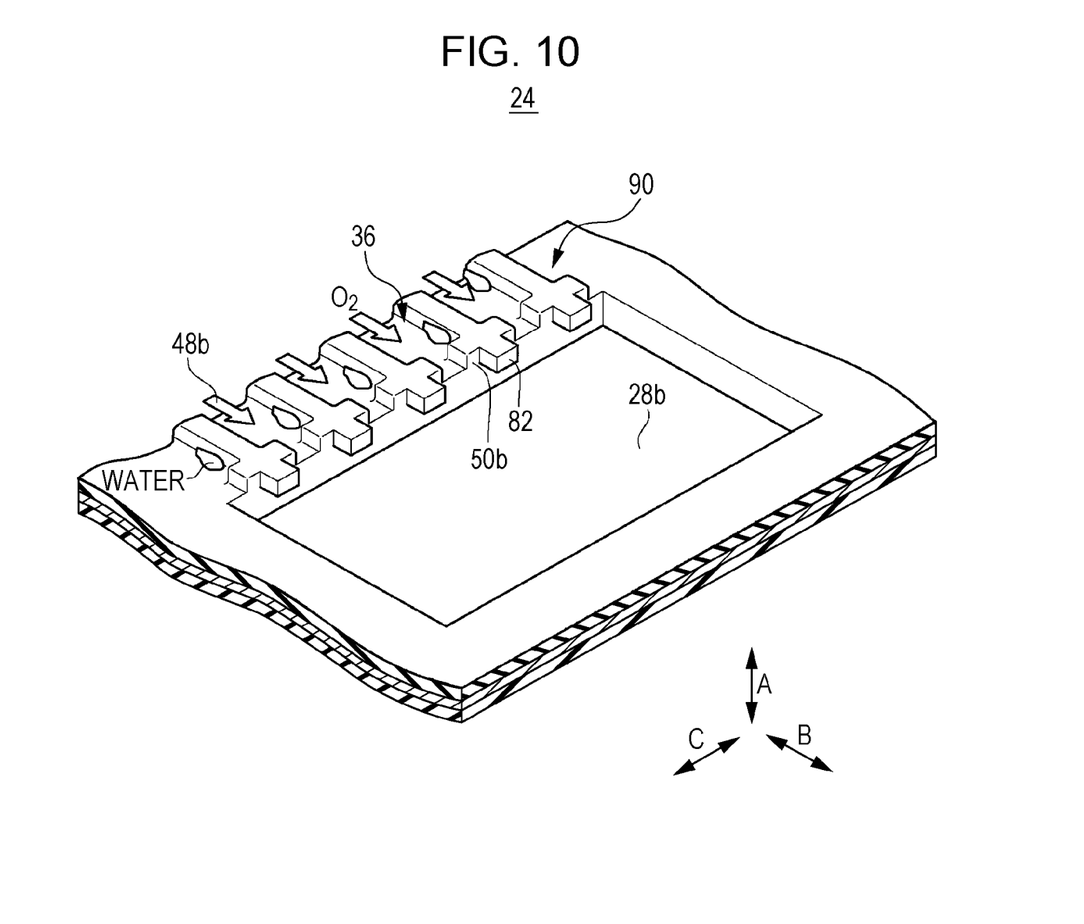
FIG. 10 is a perspective view of an outlet bridge portion of a fuel cell stack according to a third embodiment of the present invention.

FIG. 10 is a perspective view of an outlet bridge portion 90 of a fuel cell stack according to a third embodiment of the present invention.

The outlet bridge portion 90 includes the protrusions 50b and projections 82 that are integrally formed. The protrusions 50b protrude toward the connection channels 48b. The projections 82 project into the oxidant gas outlet manifold 28b. Therefore, an effect the same as that of the first and second embodiments is produced with the third embodiment.

Figure 11:
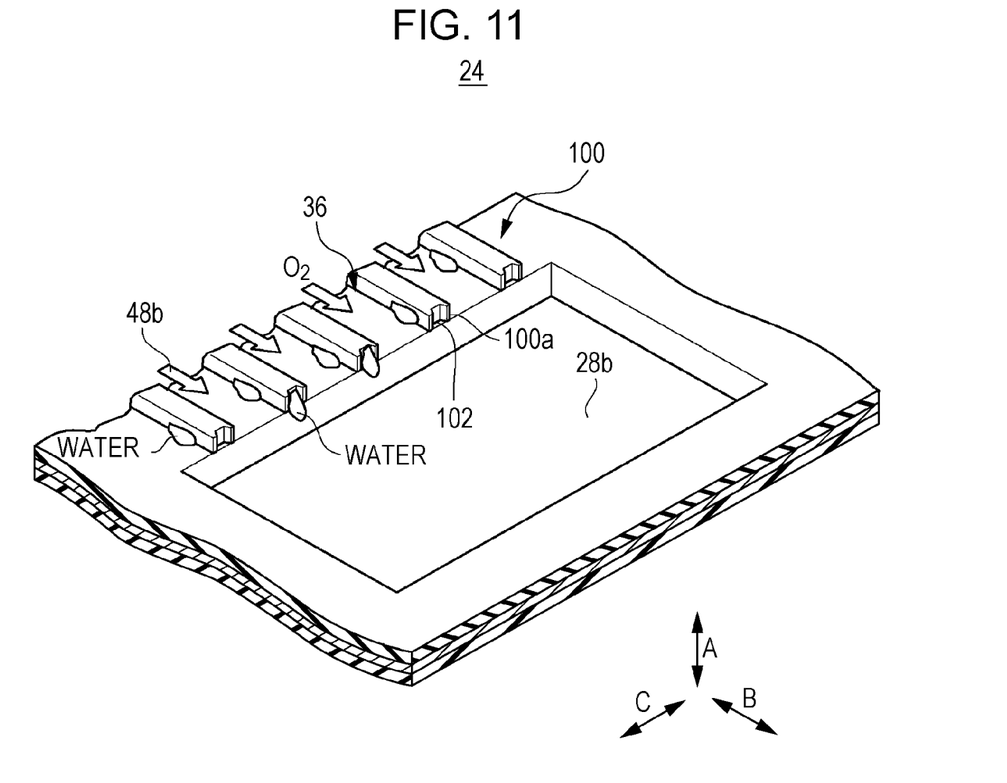
FIG. 11 is a perspective view of an outlet bridge portion of a fuel cell stack according to a fourth embodiment of the present invention.

FIG. 11 is a perspective view of an outlet bridge portion 100 of a fuel cell stack according to a fourth embodiment the present invention.

The outlet bridge portion 100 has recesses 102 that are formed in end surfaces 100a of the outlet bridge portion 100 adjacent to the oxidant gas outlet manifold 28b. The recesses 102 serve as a guide portion. The recesses 102 temporarily hold condensed water, which has flowed through the connection channels 48b, and thereby break the continuity of the condensed water. Therefore, an effect the same as that of the first to third embodiments is produced with the fourth embodiment.

Figure 12:
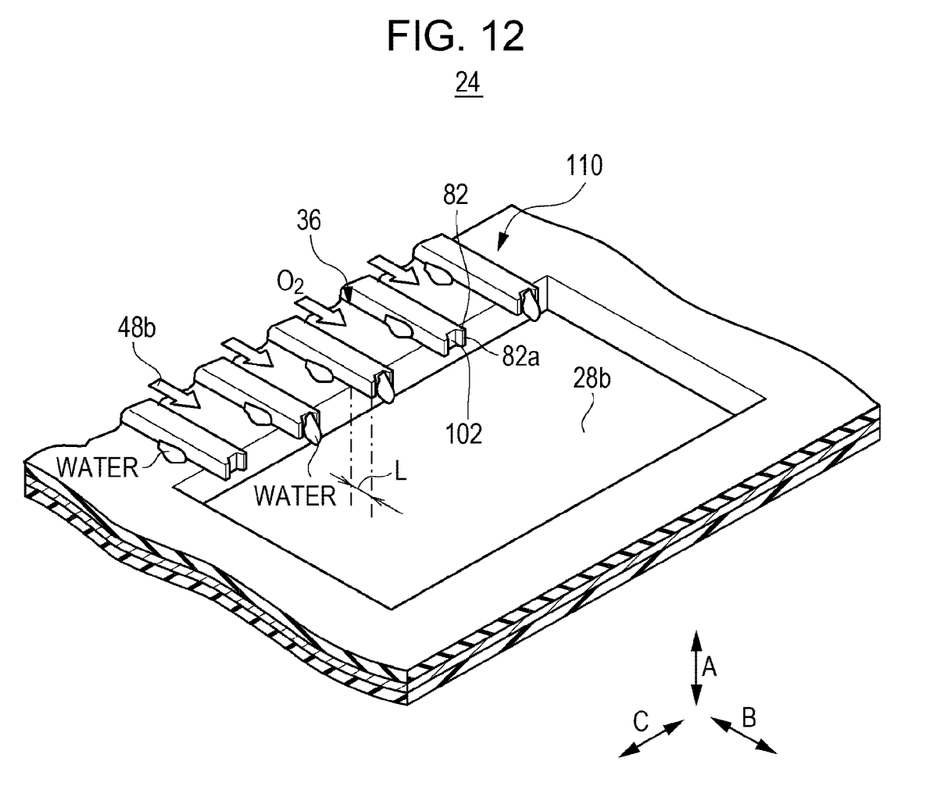
FIG. 12 is a perspective view of an outlet bridge portion of a fuel cell stack according to a fifth embodiment of the present invention.

FIG. 12 is a perspective view of an outlet bridge portion 110 of a fuel cell stack according to a fifth embodiment of the present invention.

The outlet bridge portion 110 has the projections 82 and the recesses 102. The projections are integrally formed with the outlet bridge portion 110, and project a predetermined length L into the oxidant gas outlet manifold 28b. The recesses 102 are formed in end surfaces 82a of the projections 82. The projections 82 and the recesses 102 constitute a guide portion.

Figure 13:
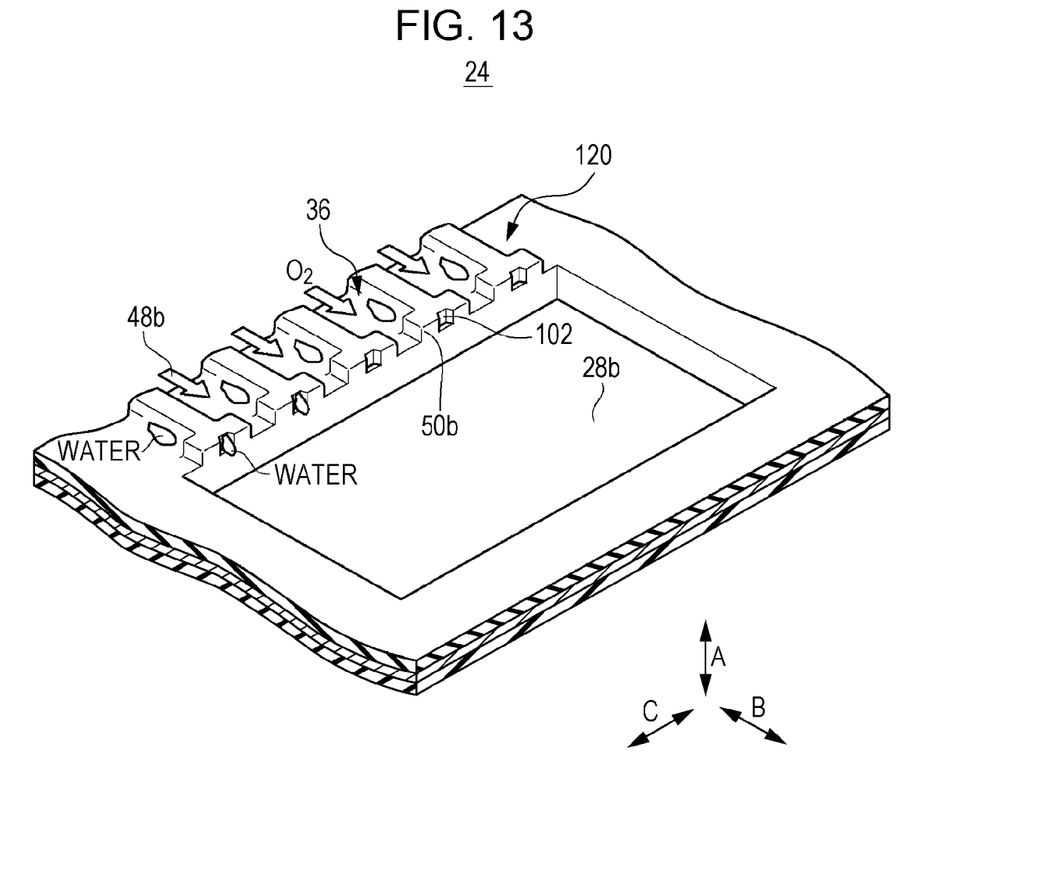
FIG. 13 is a perspective view of an outlet bridge portion of a fuel cell stack according to a sixth embodiment of the present invention.

FIG. 13 is a perspective view of an outlet bridge portion 120 of a fuel cell stack according to a sixth embodiment of the present invention.

The outlet bridge portion 120 has the protrusions 50b, and the recesses 102 that are integrally formed in end surfaces of the protrusions 50b. The protrusions 50b and the recesses 102 constitute a guide portion.

Figure 14:
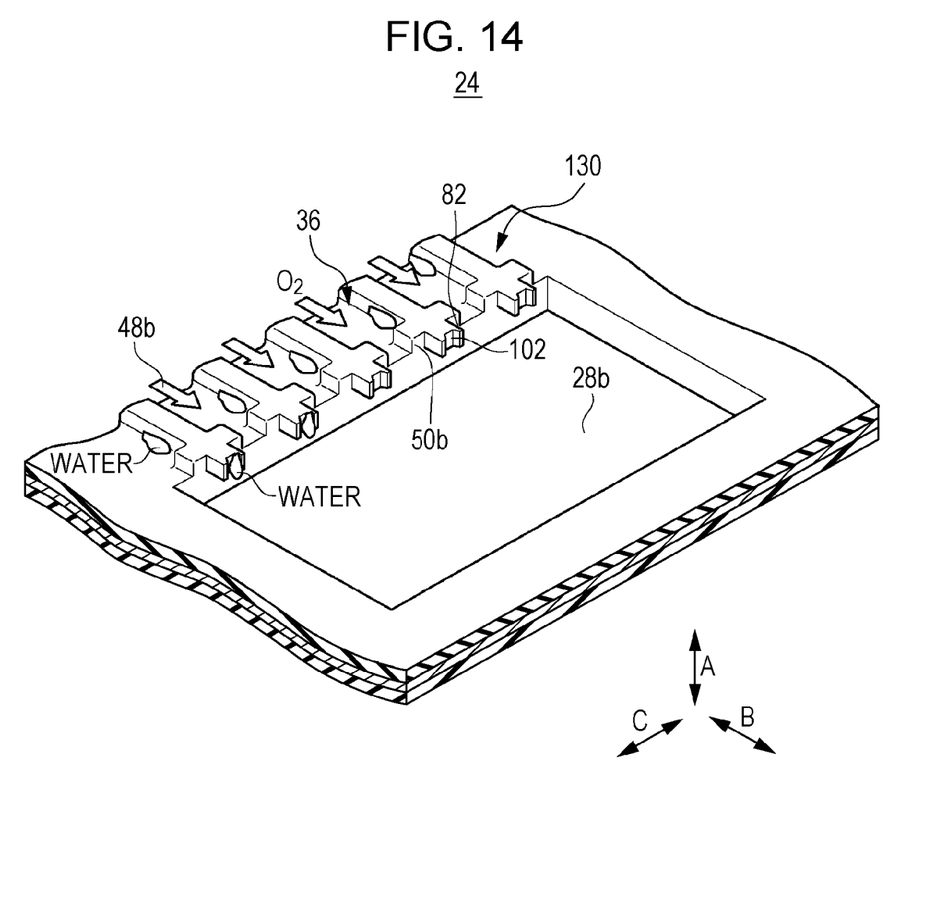
FIG. 14 is a perspective view of an outlet bridge portion of a fuel cell stack according to a seventh embodiment of the present invention.

FIG. 14 is a perspective view of an outlet bridge portion 130 of a fuel cell stack according to a seventh embodiment of the present invention.

The outlet bridge portion 130 has the protrusions 50b, the projections 82, and the recesses 102 that are integrally formed, which constitute a guide portion. Therefore, an effect the same as that of the first to fifth embodiments is produced with each of the sixth and seventh embodiments.

In the first to seventh embodiments, the bridge portion is made of a rubber. However, the bridge portion is not limited thereto. For example, a bridge portion may be made of a resin independently from the sealing member, and a guide portion may be integrally formed with such a bridge portion. The second metal separators 24 may be stacked in a staggered manner (so as to be offset) with respect to the stacking direction. In this case, the projections 82 can more reliably break the continuity of condensed water.

According to the embodiment of the present invention, a guide portion is formed in the bridge portion that forms a connection channel that connects at least the reactant gas outlet manifold to the reactant gas channel. Thus, the guide portion breaks the continuity of condensed water that flows along the connection channel. Therefore, occurrence of liquid junction between the unit cells is prevented with a simple structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a plurality of unit cells stacked in a stacking direction substantially along a direction of gravity, each of the plurality of unit cells comprising:
a first metal separator;
a second metal separator;
a membrane electrode assembly sandwiched between the first metal separator and the second metal separator and comprising:
a first electrode extending substantially in a horizontal direction;
a second electrode extending substantially in the horizontal direction; and
an electrolyte membrane sandwiched between the first electrode and the second electrode;
a reactant gas channel to allow a reactant gas to flow along a surface of each of the first and second metal separators;
a reactant gas inlet manifold and a reactant gas outlet manifold to allow the reactant gas to flow to the reactant gas inlet manifold and the reactant gas outlet manifold in the stacking direction; and a bridge portion to form a connection channel to connect at least the reactant gas outlet manifold to the reactant gas channel, the bridge portion including a guide portion to break a continuity of condensed water, wherein the guide portion comprises a protrusion formed at an end of the bridge portion adjacent to the reactant gas outlet manifold, the protrusion protruding in a width direction and being disposed in the connection channel.

2. The fuel cell stack according to claim 1,
wherein the projection projects into the reactant gas outlet manifold and being disposed in the reactant gas outlet manifold.

3. The fuel cell stack according to claim 2,
wherein the guide portion comprises a recess formed in an end surface of the bridge portion adjacent to the reactant gas outlet manifold.

4. The fuel cell stack according to claim 3,
wherein the bridge portion is made of a rubber or a resin, and
wherein the guide portion is integrally formed with the bridge portion.

5. The fuel cell stack according to claim 2,
wherein the bridge portion is made of a rubber or a resin, and
wherein the guide portion is integrally formed with the bridge portion.

6. The fuel cell stack according to claim 1,
wherein the guide portion comprises a recess formed in an end surface of the bridge portion adjacent to the reactant gas outlet manifold.

7. The fuel cell stack according to claim 1,
wherein the bridge portion is made of a rubber or a resin, and
wherein the guide portion is integrally formed with the bridge portion.

8. The fuel cell stack according to claim 1,
wherein each of the plurality of unit cells comprises
a sealing member provided on the surface of each of the first and second metal separators so as to connect the reactant gas channel to the reactant gas inlet manifold and to the reactant gas outlet manifold,
wherein the sealing member is integrally formed with each of the first and second metal separators, and
wherein the guide portion is integrally formed with the sealing member.

9. The fuel cell stack according to claim 1, wherein each of the plurality of unit cells comprises a sealing member provided on the surface of each of the first and second metal separators so as to connect the reactant gas channel to the reactant gas inlet manifold and to the reactant gas outlet manifold, wherein the sealing member is integrally formed with each of the first and second metal separators, and wherein the guide portion is integrally formed with the sealing member.

* * * * *